(12) United States Patent
Okamoto et al.

(10) Patent No.: US 10,936,806 B2
(45) Date of Patent: Mar. 2, 2021

(54) DOCUMENT PROCESSING APPARATUS, METHOD, AND PROGRAM

(71) Applicant: KABUSHIKI KAISHA TOSHIBA, Tokyo (JP)

(72) Inventors: Masayuki Okamoto, Kanagawa (JP); Ryohei Orihara, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 13 days.

(21) Appl. No.: 15/343,914

(22) Filed: Nov. 4, 2016

(65) Prior Publication Data
US 2017/0124067 A1 May 4, 2017

(30) Foreign Application Priority Data
Nov. 4, 2015 (JP) .............................. JP2015-216705

(51) Int. Cl.
*G06F 40/137* (2020.01)
*G06F 40/194* (2020.01)
*G06F 40/211* (2020.01)

(52) U.S. Cl.
CPC .......... *G06F 40/194* (2020.01); *G06F 40/211* (2020.01)

(58) Field of Classification Search
CPC ...... G06F 17/21; G06F 17/24; G06F 17/2211; G06F 17/30684; G06K 9/00469
See application file for complete search history.

(56) References Cited

U.S. PATENT DOCUMENTS

| | | |
|---|---|---|
| 4,912,063 A | 3/1990 | Davis et al. |
| 8,316,001 B1 | 11/2012 | Albrecht et al. |
| 8,566,360 B2 | 10/2013 | Chen |
| 8,645,391 B1 | 2/2014 | Wong et al. |
| 10,444,742 B2 | 10/2019 | Orihara et al. |
| 2002/0002567 A1 | 1/2002 | Kanie et al. |
| 2003/0004902 A1 | 1/2003 | Yamanishi et al. |
| 2005/0144177 A1* | 6/2005 | Hodes .................... G06F 17/27 |
| 2005/0160086 A1 | 7/2005 | Haraguchi et al. |
| 2005/0251738 A1 | 11/2005 | Hirano et al. |
| 2006/0112040 A1 | 5/2006 | Oda |

(Continued)

FOREIGN PATENT DOCUMENTS

| | | |
|---|---|---|
| JP | H 06-243132 A | 9/1994 |
| JP | H 07-334574 A | 12/1995 |

(Continued)

OTHER PUBLICATIONS

U.S. Appl. No. 15/420,834, filed Jan. 31, 2017, Nakata.

(Continued)

*Primary Examiner* — Maikhanh Nguyen
(74) *Attorney, Agent, or Firm* — Knobbe, Martens, Olson & Bear, LLP

(57) ABSTRACT

According to one embodiment, a document processing apparatus includes an acquisition unit, an extractor, and a detector. The acquisition unit acquires a first document and a second document different from the first document. The extractor extracts a first structure representing a word dependence of structural elements in the first document and extracts a second structure representing a word dependence of structural elements in the second document. The detector detects a difference for each structural element from the first structure and the second structure.

14 Claims, 11 Drawing Sheets

(56) References Cited

U.S. PATENT DOCUMENTS

| | | | |
|---|---|---|---|
| 2006/0282442 | A1 | 12/2006 | Lennon et al. |
| 2007/0005344 | A1 | 1/2007 | Sandor et al. |
| 2007/0073653 | A1* | 3/2007 | Raab ............... G06F 16/3329 |
| 2009/0077122 | A1 | 3/2009 | Fume et al. |
| 2009/0112642 | A1* | 4/2009 | Uekane ............ G06Q 10/0639 |
| | | | 705/7.38 |
| 2009/0265160 | A1* | 10/2009 | Williams ........... G06F 17/2211 |
| | | | 704/9 |
| 2010/0063948 | A1 | 3/2010 | Virkar |
| 2010/0076991 | A1 | 3/2010 | Nakano et al. |
| 2010/0114561 | A1 | 5/2010 | Yasin |
| 2010/0145678 | A1 | 6/2010 | Csomai et al. |
| 2011/0078098 | A1 | 3/2011 | Lapir et al. |
| 2011/0264691 | A1 | 10/2011 | Migita et al. |
| 2012/0030157 | A1 | 2/2012 | Tsuchida et al. |
| 2012/0197826 | A1 | 8/2012 | Mineno |
| 2013/0013291 | A1* | 1/2013 | Bullock ............. G06F 17/2785 |
| | | | 704/9 |
| 2013/0029478 | A1 | 1/2013 | Zhang et al. |
| 2013/0066912 | A1 | 3/2013 | Chetuparambil et al. |
| 2013/0076751 | A1 | 3/2013 | Jung et al. |
| 2013/0086094 | A1* | 4/2013 | Lundberg ............. G06F 16/26 |
| | | | 707/758 |
| 2013/0173257 | A1 | 7/2013 | Rose et al. |
| 2013/0179381 | A1 | 7/2013 | Kawabata et al. |
| 2013/0246048 | A1 | 9/2013 | Nagase et al. |
| 2014/0032513 | A1* | 1/2014 | Gaither ............ G06F 17/30985 |
| | | | 707/698 |
| 2014/0372257 | A1 | 12/2014 | Nishioka |
| 2015/0058309 | A1 | 2/2015 | Cho et al. |
| 2016/0055196 | A1* | 2/2016 | Collins ............... G06F 17/2211 |
| | | | 707/690 |
| 2016/0140389 | A1 | 5/2016 | Okamoto et al. |
| 2017/0075877 | A1* | 3/2017 | Lepeltier ........... G06F 17/2705 |
| 2017/0091289 | A1 | 3/2017 | Ohazulike et al. |
| 2018/0137435 | A1 | 5/2018 | Okamoto et al. |

FOREIGN PATENT DOCUMENTS

| | | |
|---|---|---|
| JP | H 09-325962 A | 12/1997 |
| JP | H 11-167576 A | 6/1999 |
| JP | 2001-134600 A | 5/2001 |
| JP | 2002-024211 A | 1/2002 |
| JP | 2002-056354 A | 2/2002 |
| JP | 2003-044481 A | 2/2003 |
| JP | 2003-167870 A | 6/2003 |
| JP | 2004-126903 A | 4/2004 |
| JP | 2005-100082 A | 4/2005 |
| JP | 2005-190338 A | 7/2005 |
| JP | 2006-065387 A | 3/2006 |
| JP | 2010-205218 A | 9/2010 |
| JP | 2010-218209 A | 9/2010 |
| JP | 4565106 B2 | 10/2010 |
| JP | 2011-108085 A | 6/2011 |
| JP | 2013-073619 A | 4/2013 |
| JP | 2013-105321 A | 5/2013 |
| JP | 2013-143039 A | 7/2013 |
| JP | 2013-196374 A | 9/2013 |
| JP | 5341276 B1 | 11/2013 |
| JP | 5356197 B2 | 12/2013 |
| JP | 2014-106611 A | 6/2014 |
| JP | 2014-137722 A | 7/2014 |
| JP | 2016-099741 A | 5/2016 |
| WO | WO 2010/119615 A1 | 10/2010 |
| WO | WO 2014/081012 A1 | 5/2014 |

OTHER PUBLICATIONS

U.S. Appl. No. 15/392,424, filed Dec. 28, 2016, Orihara et al.
U.S. Appl. No. 15/260,759, filed Sep. 9, 2016, Miyamura et al.
Ciravegna, F., "Adaptive Information Extraction from Text by Rule Induction and Generalisation", Proceedings of IJACI—2001, pp. 1-6.
Milkov Thomas, et al. "Efficient Estimation of Word Representations in Vector Space", arXiv:1301.3781, Sep. 2013, pp. 1-12.

* cited by examiner

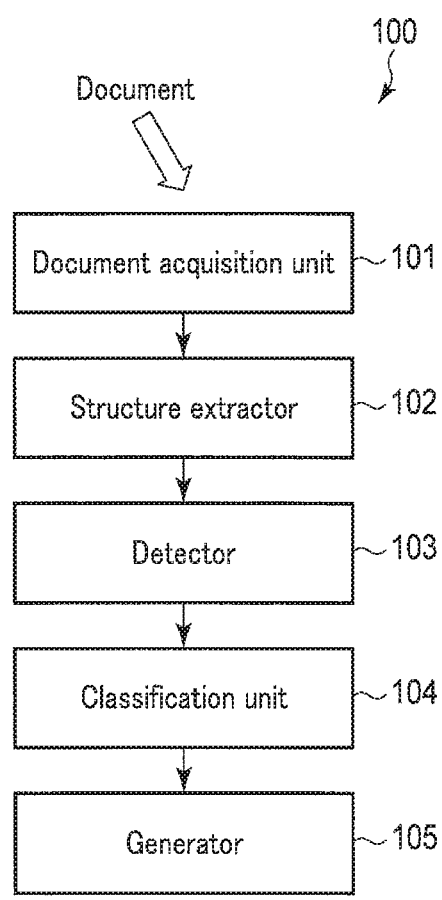
F I G. 1

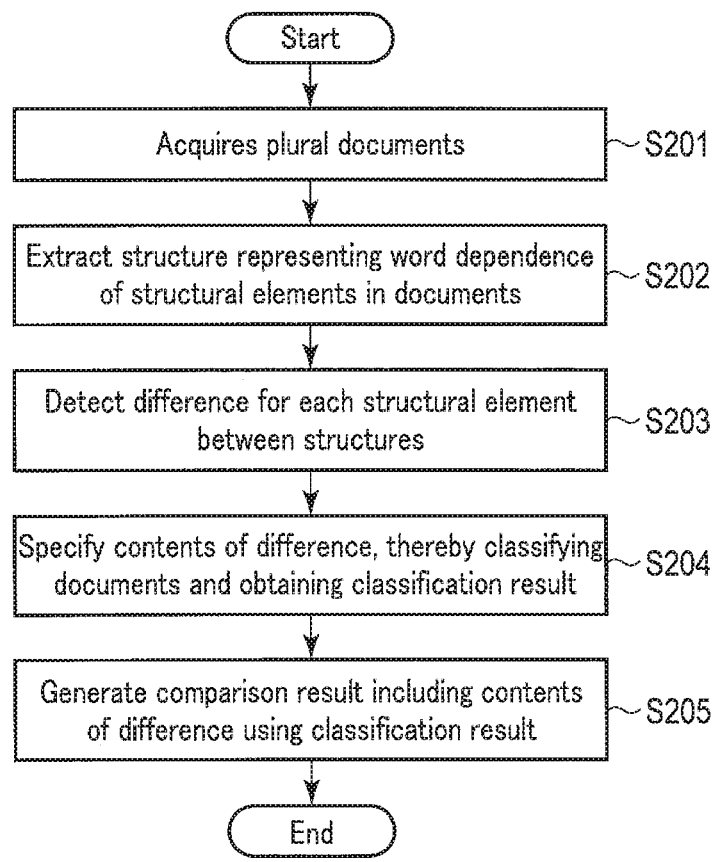
F I G. 2

(a)

A keyword presentation apparatus comprising:
document input means for accepting input of a document having date/time information as an attribute;
keyword analysis means for analyzing each of a plurality of documents whose inputs are accepted by the document input means during a designated period, thereby obtaining a word vector of each document;
topic cluster extraction means for, in sets of documents of the plurality of documents, extracting a set of documents for which an inner product of the word vectors is maximum as a topic cluster belonging to the same topic;
keyword extraction means for extracting a characteristic keyword group in the topic cluster;
topic structuring determination means for determining whether the topic can be structured by dividing the topic cluster into topic clusters of sub topics;
means for, upon determining that the topic cluster can be structured, controlling the topic cluster extraction means to recursively extract a topic cluster for the topic cluster and controlling the keyword extraction means to extract a characteristic keyword group in the thus extracted topic cluster of the sub topic; and
keyword presentation means for arranging the characteristic keyword groups in the topic clusters of the sub topics based on the date/time information and presenting the characteristic keyword groups.

(b)

Type of claim: apparatus
Feature: keyword presentation
Structural elements:
[1] [Input] document
 -[have] date/time information as an attribute
[2] [Analyze] keyword
 -[analyze] a plurality of documents
 -[obtain] the word vector of a document
[3] [Extract] topic cluster
 -[extract] a set of documents for which an inner product of word vectors is maximum as a topic cluster belonging to the same topic
[4] [Extract] keyword
 -[extract] a characteristic keyword group
[5] [Determine] topic structuring
 -[divide] the topic cluster into topic clusters of sub topics
 -[determine] whether a topic can be structured
[6] [Control] topic cluster extraction means, keyword extraction means
 -[extract] a topic cluster recursively
 -[extract] a characteristic keyword group
[7] [Present] keyword
 -[arrange] characteristic keyword groups based on the date/time information

Type of claim: apparatus
Feature: keyword presentation
Structural elements:
[1] [Input] document
  -[have] date/time information as an attribute
[2] [Analyze] keyword
  -[analyze] a plurality of documents
  -[obtain] the word vector of a document
[3] [Extract] topic cluster
  -[extract] a set of documents for which an inner product of word vectors is maximum as a topic cluster belonging to the same topic
[4] [Extract] keyword
  -[extract] a characteristic keyword group
[5] [Determine] topic structuring
  -[divide] the topic cluster into topic clusters of sub topics
  -[determine] whether a topic can be structured
[6] [Control] topic cluster extraction means, keyword extraction means
  -[extract] a topic cluster recursively
  -[extract] a characteristic keyword group
[7] [Present] keyword
  -[arrange] characteristic keyword groups based on the date/time information

402

Type of claim: apparatus
Feature: keyword presentation
Structural elements:
[1] [Input] document
  -[have] date/time information as an attribute
[2] [Analyze] keyword
  -[analyze] a plurality of documents
  -[obtain] the word vector of a document
[3] [Classify] topic genre
  -[calculate] an inner product between a word vector and a representative vector of each genre
[4] [Extract] keyword
  -[extract] a characteristic keyword group
[7] [Present] keyword
  -[arrange] characteristic keyword groups based on the date/time information

403, 404

(a)  (b)

|  | Claim of compared original | Claim of compared target |
|---|---|---|
| Modification | [3] [Extract] <u>topic cluster</u><br>-[extract] a set of documents for which an inner product of word vectors is maximum as a topic cluster belonging to the same topic | [3] [Classify] <u>topic genre</u><br>-[calculate] an inner product between a word vector and a representative vector of each genre |
| Difference | [5] [Determine] <u>topic structuring</u><br>-[divide] the topic cluster into topic clusters of sub topics<br>-[determine] whether a topic can be structured<br>[6] [Control] <u>topic cluster extraction means, keyword extraction means</u><br>-[extract] a topic cluster recursively<br>-[extract] a characteristic keyword group |  |

FIG. 6B

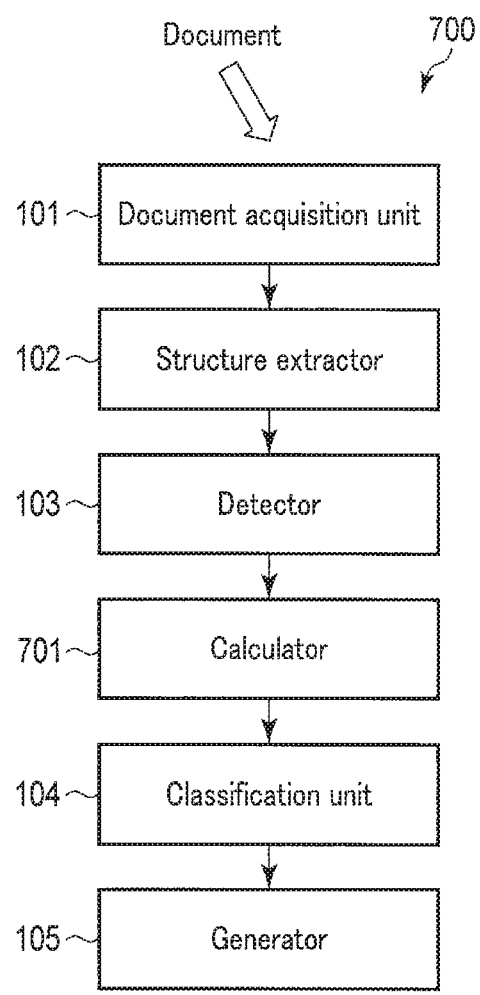
F I G. 7

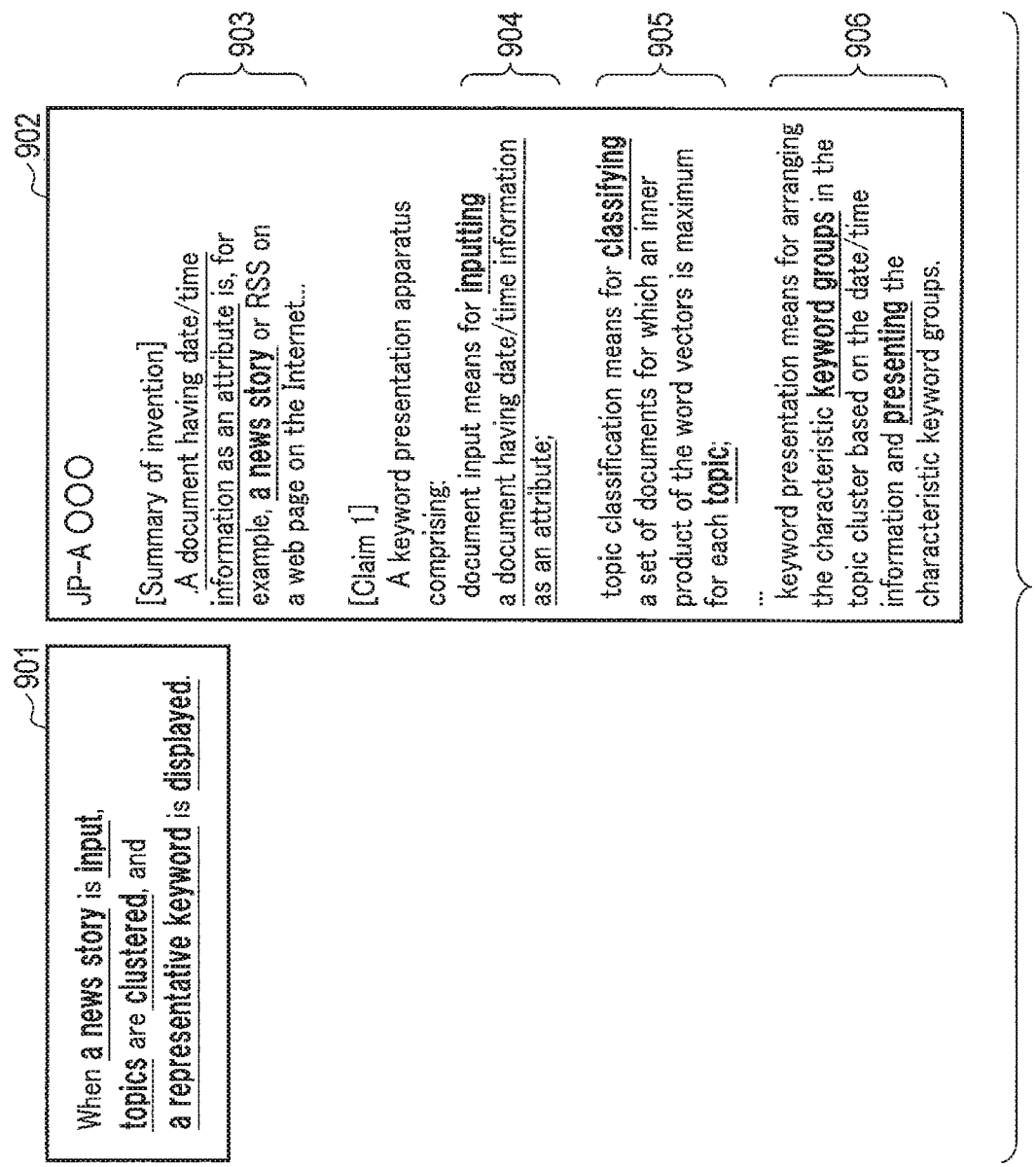
F I G. 9

1. JP Pub. No. ○○○ (score: 90)
2. JP Pub. No. △△△ (score: 85)
3. ⋯

F I G. 10

DOCUMENT PROCESSING APPARATUS, METHOD, AND PROGRAM

CROSS-REFERENCE TO RELATED APPLICATIONS

This application is based upon and claims the benefit of priority from Japanese Patent Application No. 2015-216705, filed Nov. 4, 2015, the entire contents of all of which are incorporated herein by reference.

FIELD

Embodiments described herein relate generally to a document processing apparatus, a method, and a program.

BACKGROUND

There is conventionally proposed a technique of analyzing commonalities and differences in a plurality of similar documents such as legal documents before and after an amendment and patent specifications of similar techniques. For example, there is proposed a method of comparing an existing legal document with a new legal document and extracting a difference. This method is mainly used to do analysis by detecting a difference for each line to be used to confirm the editing history between documents or by calculating the similarity between documents based on a common phrase set or a different phase set obtained by comparing document vectors and word sets included in the documents.

However, when, for example, analyzing the difference between a claim of an original application and a claim of a divisional application in patent documents, it is difficult to grasp the contents of division only by detecting a commonality or a difference based on simple phrases and character strings.

There is also proposed a method of visualizing the relationship between a plurality of patent documents based on the citation relationship of inventions. However, it is difficult to grasp the contents of the relationship between the patent documents.

BRIEF DESCRIPTION OF THE DRAWINGS

FIG. 1 is a block diagram showing a document processing apparatus according to the first embodiment;

FIG. 2 is a flowchart showing the operation of the document processing apparatus shown in FIG. 1;

FIG. 3 is a view showing an example in which the structure of a claim is extracted;

FIG. 4 is a view showing comparison of structures;

FIG. 6B is a view showing the contents of differences;

FIG. 7 is a block diagram showing a document processing apparatus according to the second embodiment;

FIG. 9 is a view showing a search example of a document processing apparatus according to the third embodiment; and FIG. 10 is a view showing a display example of a comparison result.

DETAILED DESCRIPTION

Figure 5A:
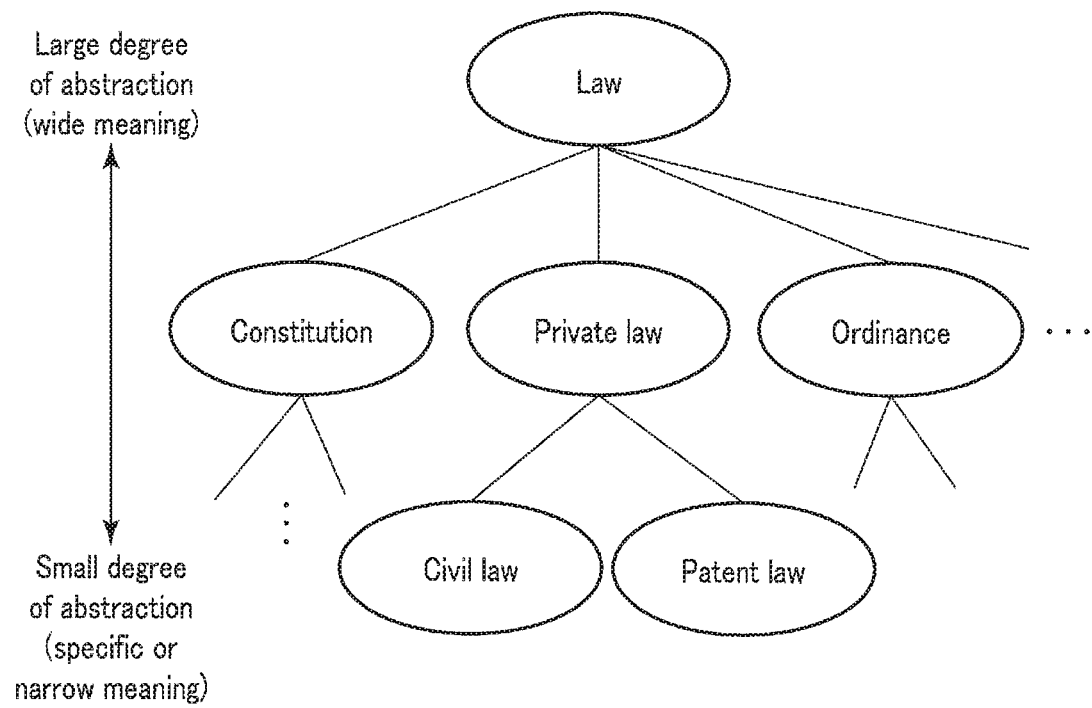
FIG. 5A is a view showing the degrees of abstraction.

Embodiments will now be described with reference to the accompanying drawings. Note that the same or similar reference numerals denote elements that are the same as or similar to those already explained, and a repetitive description will basically be omitted.

It is an object of the embodiment to provide a document processing apparatus capable of easily grasping the contents of compared documents, a method, and a program.

"Document" is assumed to be a document written in a "natural language text" hereinafter, and "document" and "natural language text" may be replaced with each other. Comparison of two different documents will mainly be explained below. However, the number of documents may be three or more, and two or more documents may be compared with one document.

In general, according to one embodiment, a document processing apparatus includes an acquisition unit, an extractor, and a detector. The acquisition unit acquires a first document and a second document different from the first document. The extractor extracts a first structure representing a word dependence of structural elements in the first document and extracts a second structure representing a word dependence of structural elements in the second document. The detector detects a difference for each structural element from the first structure and the second structure.

First Embodiment

As shown in FIG. 1, a document processing apparatus 100 according to the first embodiment includes a document acquisition unit 101, a structure extractor 102, a detector 103, a classification unit 104, and a generator 105. The document processing apparatus 100 detects a difference between documents, classifies the documents based on the difference, and generates a comparison result including the contents of the difference. The document acquisition unit 101, the structure extractor 102, the detector 103, the classification unit 104, and the generator 105 may be implemented by a central processing unit (CPU) and a memory used by the CPU. That is, the document processing apparatus can be used by a terminal capable of inputting a document and an application or a service used on the terminal.

The document acquisition unit 101 acquires a first document and a second document different from the first document. The documents may be acquired by causing a user to input them or may be acquired from a storage device (not shown). The document according to this embodiment is assumed to be text data having a predetermined structure, for example, a patent specification, a claim in scope of claim for patent (to be simply referred to as a "claim" hereinafter), or a legal document. However, the document is not limited to these, and any comparable text data is usable. The document acquisition unit 101 outputs the first document and the second document to the structure extractor 102.

The structure extractor 102 receives the first document and the second document from the document acquisition unit 101. The structure extractor 102 analyzes the first document and the second document, thereby extracting a first structure representing the word dependence of structural elements in the first document and a second structure representing the word dependence of structural elements in the second document. The structure extractor 102 outputs the first structure and the second structure to the detector 103. Note that the structure extractor 102 may extract the structures by further referring to the dependence between the words of the structural elements in the documents.

The structural elements according to this embodiment are assumed to be parts (for example, sentences or phrases) of a document necessary to interpret the document, for example, elements divided by captions or paragraphs, elements of each item in a patent specification, elements in a claim, or elements that constitute a provision in a legal document or a contract document. "Word dependence of structural elements" according to this embodiment includes at least one of "dependence between words in a structural element" and "dependence between words between structural elements". The dependence between words in a structural element according to this embodiment is assumed to be, for example, the dependence between words in one constituent element in a claim. In addition, the dependence between words between structural elements according to this embodiment is assumed to be, for example, the dependence between a word in a constituent element in a claim and a word in another constituent element.

Note that the dependence between words according to this embodiment is assumed to be, for example, the modification relationship between words corresponding to a subject, a predicate, an object, and the like. The structure according to this embodiment need only represent the dependence between words, and the display method or the presence or absence of display is not particularly limited.

The detector 103 receives the first structure and the second structure from the structure extractor 102. The detector 103 detects a difference for each structural element from the first structure and the second structure. For example, the detector 103 compares the first structure with the second structure, thereby detecting a difference for each structural element. The difference according to this embodiment is assumed to be, for example, the presence or absence of a structural element between the first structure and the second structure. The detector 103 outputs information representing the difference to the classification unit 104. Note that the detector 103 may detect a commonality for each structural element by comparing the first structure with the second structure. The detector 103 may designate some structural elements and detect differences in the designated structural elements.

The classification unit 104 receives the information representing the difference from the detector 103. The classification unit 104 specifies the contents of the difference, thereby classifying the second document and obtaining a classification result. The contents of the difference according to this embodiment are assumed to be, for example, a difference (addition or deletion) and a modification. The classification unit 104 outputs the classification result to the generator 105.

The classification unit 104 may classify the second natural language text by further using a label with a meaning for the contents of the difference and obtain a classification result. The label according to this embodiment is assumed to be, for example, "modification to another constituent element", "expansion of scope of claims", or "limitation of scope of claims".

The generator 105 receives the classification result from the classification unit 104. The generator 105 generates a comparison result including the contents of the difference using the classification result. A detailed example of the comparison result will be described later.

The generator 105 outputs the comparison result to a screen display apparatus (not shown).

The document processing apparatus 100 operates as shown in FIG. 2. A case in which claims are compared with each other will be described below as a detailed example.

In step S201, the document acquisition unit 101 acquires a plurality of documents. More specifically, the document acquisition unit 101 acquires a claim of a compared original and a claim of a compared target.

In step S202, the structure extractor 102 extracts structures representing the word dependence of structural elements in the documents. More specifically, the structure extractor 102 analyzes the claims, thereby specifying subjects, predicates, objects, and the like. The structure extractor 102 also divides the claims into elements such as "○○ unit" and "○○ means". The structure extractor 102 extracts structures representing the dependence between words in the structural elements of the claims. Note that as the analyzing techniques, existing natural language processing techniques such as morphological analysis, parsing, predicate argument structure analysis, named entity extraction, and anaphoric analysis are used.

FIG. 3 shows an example in which a claim is analyzed to extract a structure. The structure extractor 102 analyzes the claim, thereby extracting a structure that specifies the main elements of the claim, as indicated by underscoring in (a) of FIG. 3. The structure extractor 102 may extract a structure representing each structural element by a simple expression of a subject, a predicate, an object, and the like, as shown in (b) of FIG. 3. Note that if a word refers to another structural element as, for example, "the ○○ unit", or a word is expressed as a pronoun, the structure extractor 102 may perform the analysis to clarify the anaphoric relationship between the corresponding words.

In step S203, the detector 103 detects a difference for each structural element from the structures. More specifically, the detector 103 compares the structure of the claim of the compared original (to be referred to as a structure 401 of the compared original hereinafter) with the structure of the claim of the compared target (to be referred to as a structure 402 of the compared target hereinafter), thereby detecting differences, as shown in FIG. 4. The structure 401 of the compared original is the same as the structure shown in (b) of FIG. 3 described above. The differences shown in FIG. 4 correspond to structural elements [3], [5], and [6] in the structure 401 of the compared original and structural element [3] in the structure 402 of the compared target. Note that in addition to detecting a difference based on the presence or absence of a common word, the detector 103 may detect a difference using a dictionary showing the relationship of words, for example, a thesaurus, ontology, or a conceptual dictionary.

In step S204, the classification unit 104 specifies the contents of the differences, thereby classifying the documents and obtaining a classification result. More specifically, the classification unit 104 specifies a modification 403 and a difference 404 as the contents of the differences. The modification 403 represents that structural element [3] in the structure 401 of the compared original is modified to different contents in the structure 402 of the compared target. The difference 404 represents that structural elements [5] and [6] in the structure 401 of the compared original are deleted in the structure 402 of the compared target.

The classification unit 104 may add a label designated in advance to the contents of a difference. Since the modification 403 is included in the contents of the differences, the classification unit 104 adds a label "modification to another constituent element" to the contents of the difference. If the modification 403 is not specified as a difference, and only the difference 404 (in this case, only deletion) is specified, the classification unit 104 adds a label "expansion of scope of claims" to the contents of the difference. That is, if "modification" is included in the contents of the differences, the classification unit 104 adds a label "modification to another constituent element" to the contents of the difference. If "modification" is not included in the contents of the differences, and the item of deletion included in the "difference" of the contents of the differences is dominant, the classification unit 104 adds a label "expansion of scope of claims" to the contents of the difference. If the item of addition included in the "difference" of the contents of the differences is dominant, the classification unit 104 adds a label "limitation of scope of claims" to the contents of the difference.

In step S205, the generator 105 generates a comparison result including the contents of the differences using the classification result from the classification unit 104. More specifically, the generator 105 generates a comparison result shown in FIG. 6A.

Figure 6A:
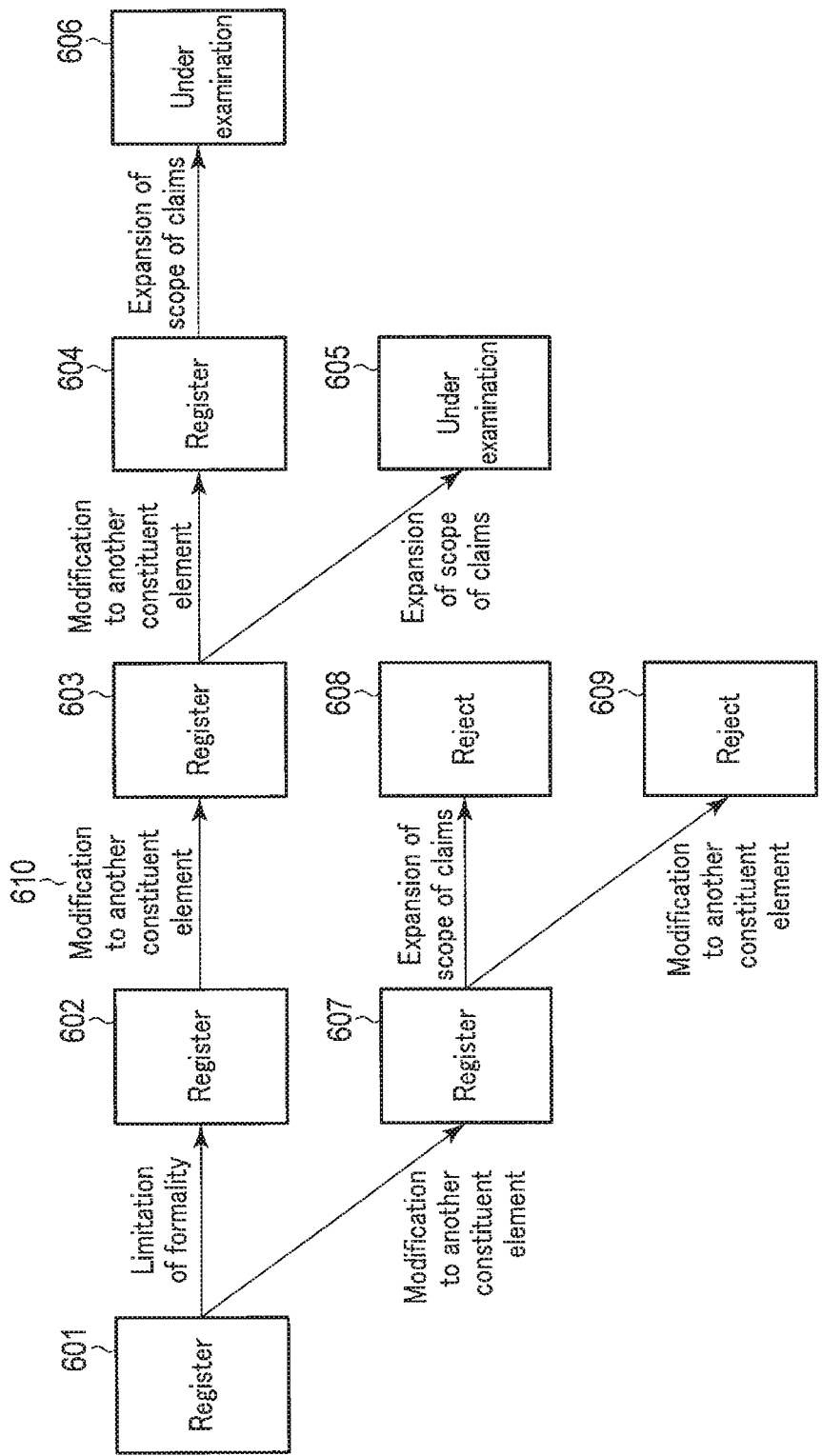
FIG. 6A is a view showing a display example of a comparison result.

In FIG. 6A, the contents of differences in claims before and after a divisional application are classified (labeled) to "limitation of scope of claims", "modification to another constituent element", and "expansion of scope of claims" and reflected on display. For example, a claim 601 is subjected to "limitation of scope of claims" and "modification to another constituent element" and divided into claims 602 and 607 in the divisional application. Further, the number in FIG. 6A indicates claims of the document assigned the number.

The claim 602 and a claim 603 shown in FIG. 6A correspond to the structure 401 of the compared original in FIG. 4 and the structure 402 of the compared target in FIG. 4, respectively. When "modification to another constituent element" that is the label of a difference 610 is selected, detailed contents of the difference as shown in FIG. 6B can be confirmed. The contents in FIG. 6B correspond to the modification 403 and the difference 404 in FIG. 4.

As described above, the document processing apparatus according to the first embodiment detects a difference between documents from which structures are extracted, classifies the documents based on the contents of the difference, and generates a comparison result including the contents of the difference. Hence, the document processing apparatus can easily grasp the contents of the difference between the compared documents.

Second Embodiment

The document processing apparatus according to the above-described first embodiment detects a difference between documents, classifies the documents based on the contents of the difference, and generates a comparison result including the contents of the difference. A document processing apparatus according to the second embodiment generates a comparison result in consideration of the magnitude of a difference as well.

As shown in FIG. 7, a document processing apparatus 700 according to the second embodiment includes a document acquisition unit 101, a structure extractor 102, a detector 103, a classification unit 104, a generator 105, and a calculator 701. The document processing apparatus 700 is different from the document processing apparatus 100 in part of the operations of the detector 103, the classification unit 104, and the generator 105, and is also different in that the calculator 701 is added.

The detector 103 receives a first structure and a second structure from the structure extractor 102. The detector 103 detects a difference for each structural element from the first structure and the second structure. The detector 103 outputs information representing the difference to the calculator 701.

The calculator 701 receives the information representing the difference from the detector 103. The calculator 701 calculates the magnitude of the difference. The magnitude of the difference according to this embodiment is calculated based on, for example, the number (amount) of deleted or added characters, the difference in the number of structural elements, the relationship of described words (for example, a synonym, hierarchical concept, or degree of abstraction), the presence or absence of a common citation, the commonality of patent classification numbers in specifications, and the like. The calculator 701 outputs the information representing the difference and the magnitude of the difference to the classification unit 104. Note that the calculator 701 may be executed in parallel to the classification unit 104 or after the classification unit 104.

The calculator 701 may determine the degree of abstraction of a word, as will be described below. For example, if a word A that exists in one document includes the meaning or concept of a word B that exists in the other document, the calculator 701 may determine that the degree of abstraction of the word A is larger than that of the word B. More specifically, as shown in FIG. 5A, a word "law" semantically includes words "constitution", "private law", "ordinance", and the like. The word "private law" semantically includes words "civil law" and "patent law". That is, the word "law" has a large degree of abstraction (that is, wide meaning), and the word "patent law" has a small degree of abstraction (that is, specific or narrow meaning).

Figure 5B:
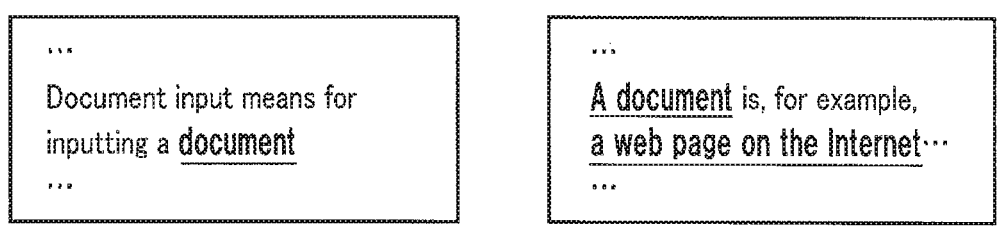
FIG. 5B is a view showing a relationship based on a support point.

The calculator 701 may consider a relationship based on a support point. More specifically, for a word "document" described in a claim shown in (a) of FIG. 5B, the calculator 701 may refer to a point "a document is, for example, a web page on the Internet" described in a specification shown in (b) of FIG. 5B, and regard "a web page on the Internet" as a detailed expression of "document".

The classification unit 104 receives the information representing the difference and the magnitude of the difference from the calculator 701. The classification unit 104 classifies the second document based on the contents of the difference. The classification unit 104 outputs the classification result and the magnitude of the difference to the generator 105.

The generator 105 receives the classification result and the magnitude of the difference from the classification unit 104. The generator 105 generates a comparison result including the contents of the difference using the classification result and the magnitude of the difference. More specifically, the generator 105 generates a comparison result in which the arrangement contents of the classification result are decided based on the analysis purpose, as shown in FIG. 8.

Figure 8:
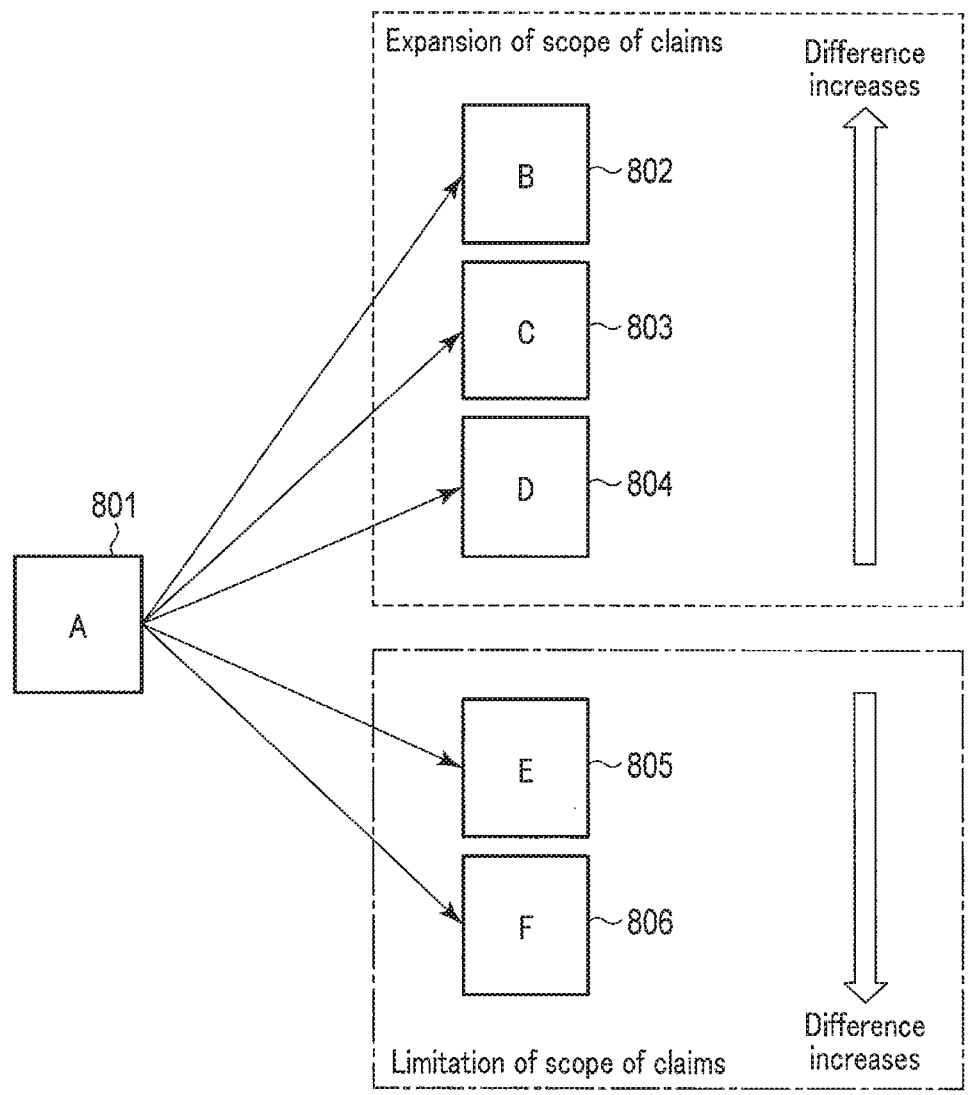
FIG. 8 is a view showing a display example of a comparison result.

Referring to FIG. 8, claims 802 to 806 (patents B to F) associated with the divisional application of a claim 801 (patent A) are reflected on display along evaluation axes "expansion of scope of claims" and "limitation of scope of claims". For example, "expansion of scope of claims" corresponds to the claims 802 to 804 in which a constituent element and the like are deleted from the claim 801, and represents that the scope of claims widens as the difference increases. "Limitation of scope of claims" corresponds to the claims 805 and 806 in which a constituent element and the like are added to the claim 801, and represents that the scope of claims narrows as the difference increases.

As described above, the document processing apparatus according to the second embodiment includes the calculator in the document processing apparatus according to the first embodiment. Since the document processing apparatus can calculate the magnitude of a difference, a comparison result in which the arrangement contents are decided based on the analysis purpose can be generated. Hence, the document processing apparatus can easily grasp the contents of the difference between the compared documents.

Third Embodiment

The document processing apparatus according to the above-described second embodiment detects a difference between documents, calculates the magnitude of the difference, classifies the documents based on the contents of the difference, and generates a comparison result including the contents of the difference. A document processing apparatus according to the third embodiment detects a commonality between documents, calculates the magnitude of the commonality, and generates a comparison result based on the magnitude of the commonality.

The document processing apparatus according to the third embodiment is different from the document processing apparatus 700 in part of the operations of a detector 103, a generator 105, and a calculator 701. Note that as the document processing apparatus according to the third embodiment, the arrangement shown in FIG. 7 is used.

The detector 103 receives a first structure and a second structure from a structure extractor 102. The detector 103 detects a commonality for each structural element from the first structure and the second structure. The commonality according to this embodiment is assumed to be, for example, a point where the structures have a common or similar dependence between words. More specifically, the detector 103 considers that a relationship "topics are clustered" in the first structure is similar to a relationship "classified for each topic" in the second structure, and detects these pieces of information as a commonality. The detector 103 outputs information representing the commonality to the calculator 701.

The calculator 701 receives the information representing the commonality from the detector 103. The calculator 701 calculates the magnitude of the commonality. The magnitude of the commonality according to this embodiment is calculated based on, for example, the relationship of described words (for example, a synonym or hierarchical concept). The calculator 701 outputs the information representing the commonality and the magnitude of the commonality to a classification unit 104.

The classification unit 104 receives the information representing the commonality and the magnitude of the commonality from the calculator 701. The classification unit 104 classifies the second document based on the contents of the commonality and the magnitude of the commonality.

The classification unit 104 outputs the classification result and the magnitude of the commonality to the generator 105.

The generator 105 receives the classification result and the magnitude of the commonality from the classification unit 104. The generator 105 generates a comparison result including the contents of the commonality using the classification result and the magnitude of the commonality.

Note that if the processing of the classification unit 104 is omitted, the following operation may be performed. The calculator 701 outputs the information representing the commonality and the magnitude of the commonality to the generator 105. The generator 105 receives the information representing the commonality and the magnitude of the commonality from the calculator 701. The generator 105 generates a comparison result using the magnitude of the commonality.

An example in which a search query is input as the first document, and a patent document (JP Pub. No. ◯◯◯) as a search target is input as the second document will be described below with reference to FIG. 9.

The structure extractor 102 analyzes the search query and the patent document, thereby extracting structures representing the dependence between words in structural elements as structures 901 and 902. In the structure 902, the structure extractor 102 can detect the dependence between the structural elements as well.

For example, for "a document having date/time information as an attribute" of a structural element 904 in the structure 902, the structure extractor 102 refers to "a document having date/time information as an attribute" and "a news story" in a paragraph 903, and detects that "a document having date/time information as an attribute" and "a news story" hold a synonym relationship.

The detector 103 compares the structure 901 with the structure 902, thereby detecting the commonality for each structural element of the structure 901. For example, the detector 103 detects "classified for each topic" of a structural element 905 corresponding to "topics are clustered" in the structure 901, and detects "presenting a keyword group . . . " of a structural element 906 corresponding to "a representative keyword is displayed" in the structure 901. In the case of "a news story is input" in the structure 901, since it is detected that "a news story" in the paragraph 903 and "a document having date/time information as an attribute" hold a synonym relationship, the detector 103 detects "inputting a document having date/time information as an attribute" in the structural element 904.

The calculator 701 adds a score to the commonality for each structural element of the structure 901, thereby calculating the magnitude of the commonality. As for the score addition, the score may be determined based on the similarity of a word or the like or using an existing technique.

Figure 10:
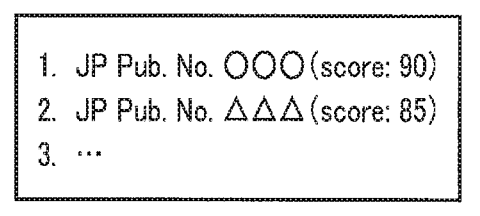

The generator 105 generates a comparison result as shown in FIG. 10 based on the score of the commonality. The comparison result shown in FIG. 10 indicates that patent documents similar to the search query are ranked.

Note that the document processing apparatus according to the third embodiment may compare the first structure with the second document. For example, the detector detects a commonality not based on the relationship of "a news story is input" in the first structure but simply using two words "news story" and "input". The calculator adds a higher score to a commonality for which the two words are included in one structural element than a commonality for which the two words are included in separate structural elements.

As described above, the document processing apparatus according to the third embodiment can detect the commonality between documents using the document processing apparatus according to the second embodiment. Hence, the document processing apparatus can easily grasp the contents of the commonality between the compared documents.

At least some of the processes according to the above embodiments can also be implemented using a computer as hardware. The computer is not limited to a personal computer, and an arbitrary apparatus capable of executing a program, for example, an arithmetic processing unit or a microcontroller may be used. The computer is not limited to one apparatus, and a system formed by connecting a plurality of apparatuses via a network such as the Internet or a LAN may be used. Middleware (for example, an OS, database management software, a network, or the like) in the computer may perform at least some of the processes according to the above embodiments based on an instruction in a program installed in the computer.

The program that implements the processes may be saved in a computer-readable storage medium. The program is saved in the storage medium as a file of an installable or executable format. The program may be saved in one storage medium or divisionally saved in a plurality of storage media. The storage medium need only be able to save a program and be readable by a computer. Examples of the storage medium are a magnetic disk, a flexible disk, a hard disk, an optical disk (for example, a CD-ROM, a CD-R, and a DVD), a magnetooptical disk (for example, an MO), and a semiconductor memory.

The program that implements the processes may be saved on a computer (server) connected to a network and downloaded to a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document processing apparatus for processing patent-related documents, the apparatus comprising processing circuitry coupled to a memory, the processing circuitry configured to:
   acquire a first claim described in a first document and a second claim described in a second document different from the first document;
   extract a first structure including at least one structural element from the first claim and extract a second structure including at least one structural element from the second claim, the at least one structural element in the first structure and the at least one structural element in the second structure each including at least one of a portion of a subject, a base form of a predicate, or a portion of an object that is extracted from the first claim and the second claim based on a word dependence of structural elements in the first claim and the second claim, respectively; and
   detect a difference for each structural element from the first structure and the second structure, the difference being calculated based on presence or absence of a structural element between structural elements included in the first structure and structural elements included in the second structure,
   wherein the processing circuitry is further configured to:
      classify the difference as a modification, an addition, or a deletion, wherein the modification indicates that the first structural element differs from the second structural element, the addition indicates that a new structural element is added into the second structure, and the deletion indicates that the first structural element is deleted,
      add a first label to the second claim, the first label indicating modification to the second claim based on the classified difference
      add a second label to the second claim, the second label indicating an expansion of scope of the second claim, based on the classified difference,
      add a third label to the second claim, the third label indicating a limitation of the scope, based on the classified difference, and
      display the second claim with the first label, the second label, or the third label.

2. The apparatus according to claim 1, wherein the contents of the difference include addition, deletion, and first modification of a word, and the processing circuitry is configured to classify the second claim based on which one of the addition, the deletion, and the first modification corresponds to the contents of the difference.

3. The apparatus according to claim 1, wherein the processing circuitry is further configured to generate a comparison result including the contents of the difference using the classification result.

4. The apparatus according to claim 3, wherein the processing circuitry is further configured to calculate a magnitude of the difference, and
   generate the comparison result further using the magnitude of the difference.

5. The apparatus according to claim 3, wherein the processing circuitry is configured to generate the comparison result in which arrangement contents of the classification result are decided based on an analysis purpose.

6. The apparatus according to claim 1, wherein the processing circuitry is configured to detect, as the difference, presence or absence of a structural element between the first structure and the second structure.

7. The apparatus according to claim 1, wherein the processing circuitry is configured to detect a commonality for each structural element by comparing the first structure with the second structure.

8. The apparatus according to claim 1, wherein the processing circuitry is configured to designate some of the structural elements, and to detect the differences in the designated structural elements.

9. The apparatus according to claim 1, wherein the processing circuitry is configured to acquire the first document and the second document, which are written in a natural language text.

10. The apparatus according to claim 1, wherein the word dependence of the structural elements includes at least one of a first dependence between words in a structural element or a second dependence between words between structural elements,
   each of the first dependence and the second dependence includes a modification relationship between words, and
   the processing circuitry extracts at least one of the first dependence or the second dependence.

11. The apparatus according to claim 1, wherein the processing circuitry is configured to add, to the contents of the difference, a fourth label indicating second modification to another element in the second claim, if the second modification is included in the contents of the difference.

12. The apparatus according to claim 1, wherein the processing circuitry is configured to add the second label indicating the expansion of scope of the second claim to the contents of the difference, if the contents of the difference do not include the modification to an element in the second claim and if the contents of the difference dominantly include deletion as the detected difference between the first structure and the second structure, and the processing circuitry is configured to add the third label indicating the limitation of scope of the second claim to the contents of the difference, if the contents of the difference do not include the modification to an element in the second claim and if the contents of the difference dominantly include addition as the detected difference between the first structure and the second structure.

13. The apparatus according to claim 1, wherein the processing circuitry is configured to:

extract the first structure by dividing the first claim into individual constituent elements and extracting the at least one of the portion of the subject, the base form of the predicate, or the portion of the object from the individual constituent elements, and extract the second structure by dividing the second claim into individual constituent elements and extracting the at least one of the portion of the subject, the base form of the predicate, or the portion of the object from the individual constituent elements.

14. The apparatus according to claim 1, wherein the processing circuitry is configured to compare a structural element in the first structure with a structural element in the second structure to detect the difference for each structural element.

* * * * *